United States Patent [19]

Maruyama

[11] 4,186,328

[45] Jan. 29, 1980

[54] ELECTRONIC FLASH

[75] Inventor: Yuji Maruyama, Suita, Japan

[73] Assignee: West Electric Company, Ltd., Osaka, Japan

[21] Appl. No.: 900,299

[22] Filed: Apr. 26, 1978

[30] Foreign Application Priority Data

Apr. 30, 1977 [JP] Japan ................................ 52/50215

[51] Int. Cl.[2] ...................... H05B 41/32; H04B 41/36

[52] U.S. Cl. .................................... 315/151; 315/159; 315/241 P; 354/33; 354/60 F; 354/139; 354/145

[58] Field of Search ............ 315/151, 156, 159, 241 P; 354/33, 60 F, 137–139, 145, 149; 250/214 P

[56] References Cited

U.S. PATENT DOCUMENTS 3,710,701 1/1973 Takishima et al. ............. 354/145 X 3,823,410 7/1974 Tokutomi et al. ..................... 354/33

*Primary Examiner*—Eugene R. LaRoche

*Attorney, Agent, or Firm*—Burgess, Ryan and Wayne

[57] ABSTRACT

An electronic flash of the type incorporating the so-called variable guide number device or a flash duration control device for controlling the quantity of a flash of light emitted from a flash lamp. In an integrating circuit of the variable guide number device diodes are used so that their forward bias characteristics may be utilized for the accurate control of a flash duration.

4 Claims, 6 Drawing Figures

ELECTRONIC FLASH

BACKGROUND OF THE INVENTION

The present invention relates to an electronic flash incorporating the so-called variable guide number device or a device for controlling a flash duration.

The variable guide number device comprises in general a flash duration control circuit or a circuit for controlling the quantity of a flash of brilliant light emitted from a flash lamp, a switching circuit, an integrating circuit and a signal generating circuit for controlling the flash duration control circuit. When a shutter is released, a trigger circuit is actuated so that a flash lamp converts the energy stored on a main discharge capacitor into a flash of light. The energy charged on another capacitor is discharged through a first resistor, the flash lamp, a second resistor and a zener diode. An integrating capacitor is charged with a constant voltage across this zener diode through a variable resistor, and when the voltage across the integrating capacitor rises to a predetermined level, a first transistor is enabled so that a second transistor is enabled to apply a gate voltage to the gate of a thyristor in another trigger circuit. This trigger circuit causes a bypass lamp to conduct so that the flash lamp is turned off; that is, a flash duration is controlled.

The zener diode is therefore a power source of the variable guide number device for actuating the signal generating circuit which in turn actuates the flash duration control circuit. A desired guide number may be set with the variable resistor. In the above flash duration control system wherein the conduction timing of the first transistor is controlled by the integrating circuit consisting of the variable resistor and the integrating capacitor which is charged through the variable resistor with the voltage across the zener diode, in order to control a flash duration over a wide range from a very short flash duration to a manual flash control the current which flows from the zener diode through the variable resistor into the integrating capacitor must be varied over a wide range. Therefore the variable resistor must have a high end resistance, but because of the mechanical characteristics of the precision variable resistors and due to the manufacture tolerances, it is difficult to maintain desired accuracy or linearity tolerance over the whole range so that an error or the departure of an actual value from a setting value results. The error in the variable resistor causes an error in charging time of the integrating capacitor and hence an error in the conduction timing of the first transistor and consequently an error in flash duration control.

SUMMARY OF THE INVENTION

Accordingly one of the objects of the present invention is to provide an electronic flash incorporating a variable guide number device capable of accurate control of a flash duration.

Briefly stated, to the above and other ends, the present invention provides an electronic flash of the type incorporating a variable guide number device comprising a signal generating circuit comprising an integrating circuit for integrating a voltage across a constant voltage element which is actuable in response to turning on of a flash lamp, and a switching circuit actuable in response to the output from said integrating circuit; and a flash duration control circuit or a circuit for controlling the quantity of a flash of light emitted from said flash lamp in response to the output from said signal generating circuit; characterized in that said integrating circuit comprises a series circuit consisting of a variable resistor, a first diode and an integrating capacitor connected in series in the order named; and a second diode connected in parallel with a series circuit consisting of said first diode and said integrating capacitor, whereby a charging voltage for said integrating capacitor may be controlled by said variable resistor and said first and second diodes.

BRIEF DESCRIPTION OF THE DRAWINGS

Same reference numerals are used to designate similar parts throughout the figures.

DESCRIPTION OF THE PREFERRED EMBODIMENTS

Figure 1:
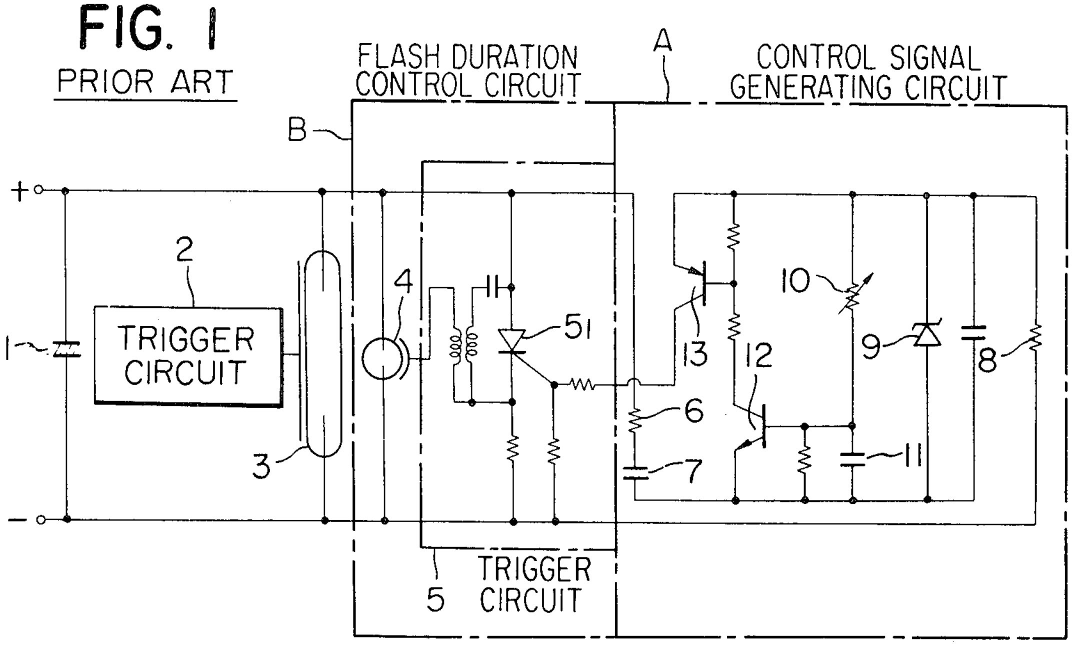
FIG. 1 PRIOR ART
FIG. 1 is a circuit diagram of a prior art electronic flash incorporating a variable guide number device.

Prior Art, FIG. 1

Prior to the description of the preferred embodiments of the present invention, a prior art electronic flash will be described. A variable guide number device of this electronic flash comprises in general a flash duration control circuit or a circuit for controlling the quantity of a flash of limit emitted from a flash lamp, a switching circuit, an integrating circuit and a circuit for generating a signal for controlling the flash duration control circuit.

Referring to FIG. 1, the mode of operation of the electronic flash with the variable guide number device of the type described will be briefly described. When a shutter is released, a trigger circuit 2 is actuated so that a flash lamp 3 converts the energy stored on a main discharge capacitor 1 into a flash of brilliant light. Simultaneously the energy which has been stored through a resistor 6 on a capacitor 7 is discharged through the resistor 6, the flash lamp 3, a resistor 8 and a zener diode 9, and in response to a voltage across the zener diode 9 an integrating circuit consisting of a variable resistor 10 and an integrating capacitor 11 is actuated. When a voltage stored across the integrating capacitor 11 reaches a predetermined level, a transistor 12 is enabled so that a transistor 13 is also enabled. As a result, a gate voltage is impressed to the gate of a thyristor $5_1$, whereby the latter is conducted; that is, a trigger circuit 5 is actuated. Therefore a bypass lamp 4 is conducted; that is, the flash lamp 3 is bypassed so that a flash duration may be controlled.

The voltage across the zener diode 9 starts the operation of a control signal generating circuit A which in turn causes the operation of the flash duration control circuit B. Therefore the zener diode 9 may be regarded as a power source for the variable guide number device.

The guide number may be varied by varying the resistance of the variable resistor 10.

In the flash duration control system wherein as described above the voltage across the zener diode 9 and the integrating circuit consisting of the variable resistor 10 and the integrating capacitor 11 control the conduction timing of the transistor 12. Therefore in order to control a flash duration over a wide range from a very short flash duration to a manual flash control, the charging current which flows from the zener diode 9 through the variable resistor 10 into the integrating capacitor 11 must be also controlled over a wide range so that the variable resistor 10 must vary its resistance value over a wide range; that is, the variable resistor 10 must have a high end resistance. However, because of the mechanical characteristics of the precision variable resistors and because of manufacture tolerances, it is very difficult to maintain high accuracy or severe linearity tolerance over the whole range so that the departure of an actual value from a setting value results. An error in the variable resistor 10 in turn causes an error in charging time of the integrating capacitor 11 and hence in the conduction timing of the transistor 12. As a result, a precise flash control has been impossible.

Figure 2:
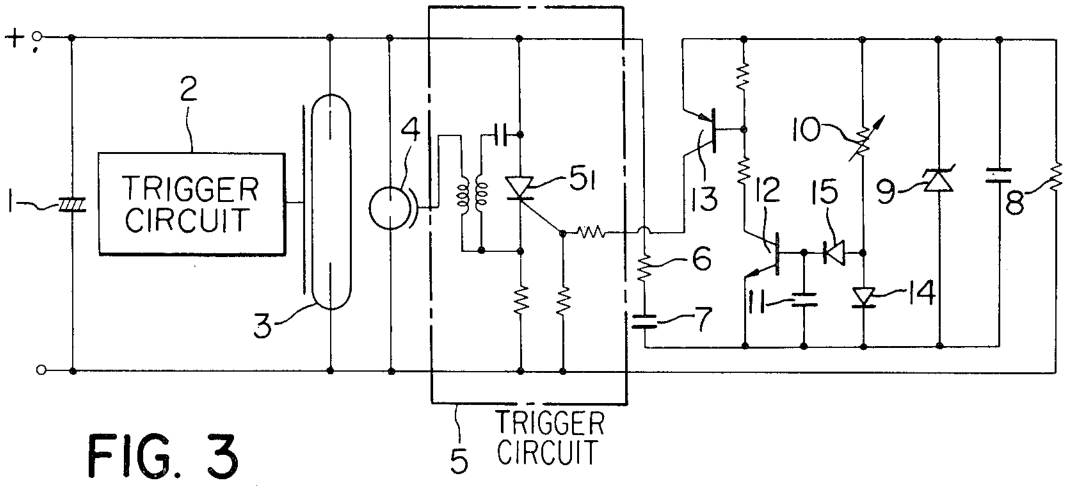
FIG. 2 is an electrical circuit diagram of an electronic flash incorporating a first embodiment of a variable guide number device in accordance with the present invention.

First Embodiment, FIG. 2

The first embodiment of the present invention shown in FIG. 2 is different in construction from the prior art electronic flash shown in FIG. 1 in that two diodes 14 and 15 are added to the integrating circuit.

When the shutter is released, the flash lamp 3 is fired and a predetermined voltage is obtained across the zener diode 9 in the manner described above. The charging current flows from the zener diode 9 through the variable resistor 10 and the diode 15 into the integrating capacitor 11. When a voltage across the integrating capacitor 11 reaches a predetermined level, the transistor 12 is enabled so that the transistor 13 is also enabled to actuate the trigger circuit 5. As a result, the bypass lamp 4 is conducted so that the flash lamp 3 is turned off. The underlying principle of the first embodiment of the present invention is substantially similar to that of the prior art device described above in conjunction with FIG. 1, but as shown in FIG. 2 in the first embodiment the variable resistor 10 and the diode 15 are connected in series to the integrating capacitor 11 which in turn is interconnected between the base and emitter of the transistor 12, and the diode 14 is connected in parallel with the integrating capacitor 11. As a result, the charging characteristic of the integrating capacitor 11 which controls the conduction timing of the transistor 12 is by far different from that of the integrating capacitor 11 of the device shown in FIG. 1 as will be described in detail below.

As described above, the integrating capacitor 11 is charged with a voltage across the zener diode 9 obtained when the flash lamp 3 is turned on. Since the diode 14 is connected in parallel with the integrating capacitor 11 while the diode 15 is connected in series thereto, the charging current flowing into the integrating capacitor 11 is controlled by the diodes 14 and 15. That is, the charging characteristic of the integrating capacitor 11 is dependent upon the forward-biased characteristics of these diodes 14 and 15 that a forward current varies nonlinearly with applied voltage. Therefore the variation in resistance of the variable resistor 10 causes a greater variation in charging current flowing into the integrating capacitor 11 in the first embodiment shown in FIG. 2 than in the prior art device shown in FIG. 1. That is, while the variable resistor 10 in the prior art device shown in FIG. 1 is used for controlling the charging current linearly, the variable resistor 10 in the first embodiment shown in FIG. 2 is used for controlling the characteristics of the diodes 14 and 15. Therefore a small variation in resistance of the variable resistor 10 causes a wide variation in charging current flowing into the integrating capacitor 11 so that the variable resistor 10 may have a low end resistance as compared with the variable resistor 10 in the prior art device shown in FIG. 1. As a consequence, the first embodiment of the present invention may substantially overcome the problem of the prior art device that the precise flash duration control cannot be attained due to the lack of accuracy or because of the wide linearity tolerance of the variable resistor 10.

Figure 3:
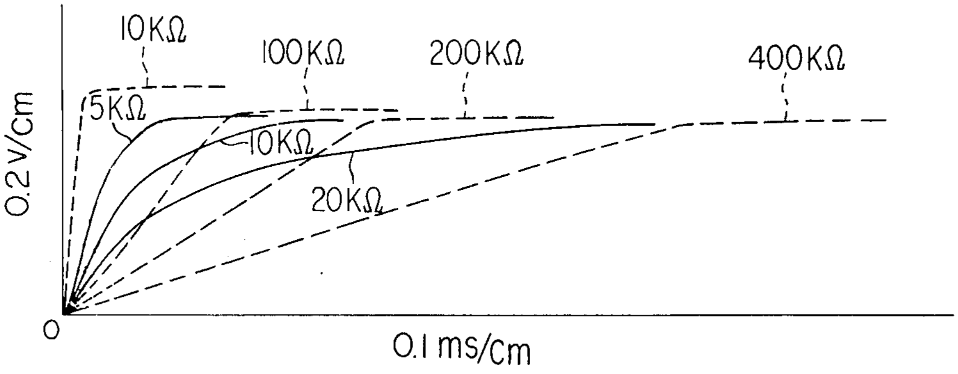
FIG. 3 shows waveforms of the voltage across an integrating capacitor 11 shown in FIGS. 1 and 2 when the value of a variable resistor 10 is varied, the solid line curves showing the waveforms of the device shown in FIG. 2 while the broken line curves showing the waveforms of the device shown in FIG. 1.

FIG. 3 shows voltage curves of the integrating capacitor 11 when the value of the variable resistor 10 is varied. The solid line curves show the voltages across the integrating capacitor 11 shown in FIG. 2 while the broken line curves, the voltages across the integrating capacitor 11 in FIG. 1. It is readily seen that as compared with the prior art device shown in FIG. 1 the first embodiment of the present invention may attain a wide variation in charging voltage with a small variation in resistance.

SECOND EMBODIMENT, FIG. 4

Figure 4:
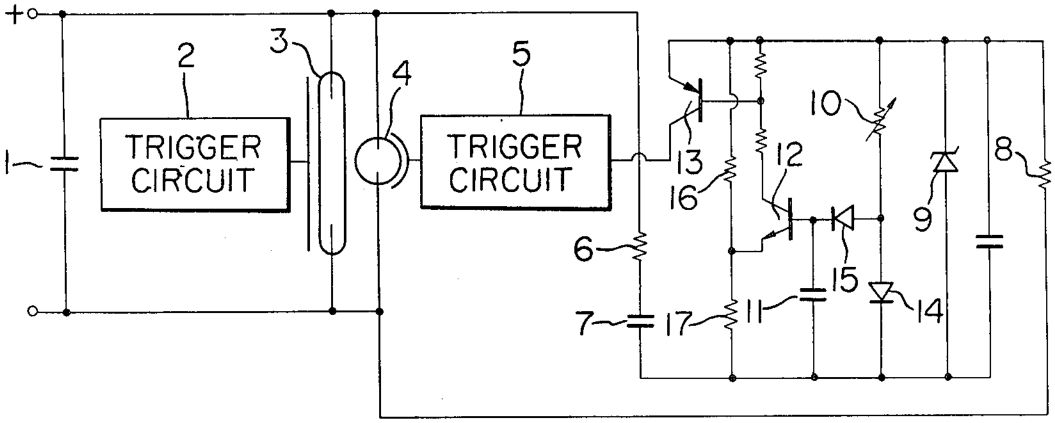
FIGS. 4, 5 and 6 are electrical circuit diagrams of second, third and fourth embodiments, respectively, of the present invention.

The second embodiment of the present invention shown in FIG. 4 is substantially similar in construction to the first embodiment shown in FIG. 2 except that the emitter of the transistor 12 is biased through resistors 16 and 17 so that when the base potential exceeds the emitter potential the transistor 12 may be enabled. Therefore the conduction timing of the transistor 12 is controlled not only by a voltage charged across the integrating capacitor 11 but also an emitter voltage which in turn is dependent upon the values of the resistors 16 and 17. Thus a flash duration may be more accurately controlled in response to a selected guide number.

In both the first and second embodiments described above with reference to FIGS. 2 and 4, a guide number is set by the variable resistor 10, but in the second embodiment the linearity tolerance of the variable resistor 10 may be further compensated by the esgablishment of the emitter potential level of the transistor 12.

Figure 5:
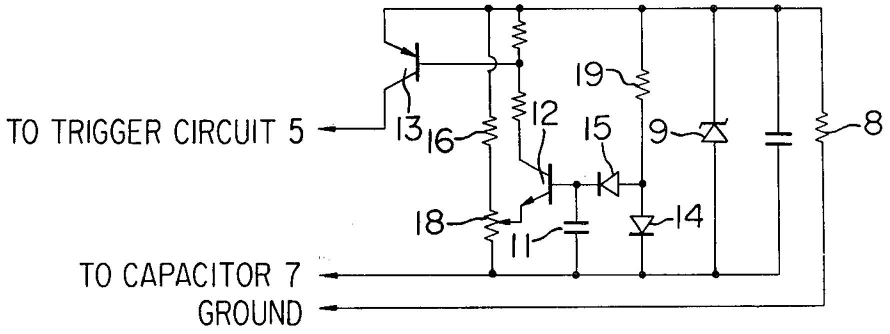

Third Embodiment, FIG. 5

The third embodiment of the present invention shown in FIG. 5 is substantially similar in construction to the second embodiment described above with reference to FIG. 4 except that instead of the fixed resistor 17 of the second embodiment, a variable resistor 18 is used and instead of the variable resistor 10 of the second embodiment, a fixed resistor 19 is used. A guide number is set with the variable resistor 18 which sets an emitter potential level.

Figure 6:
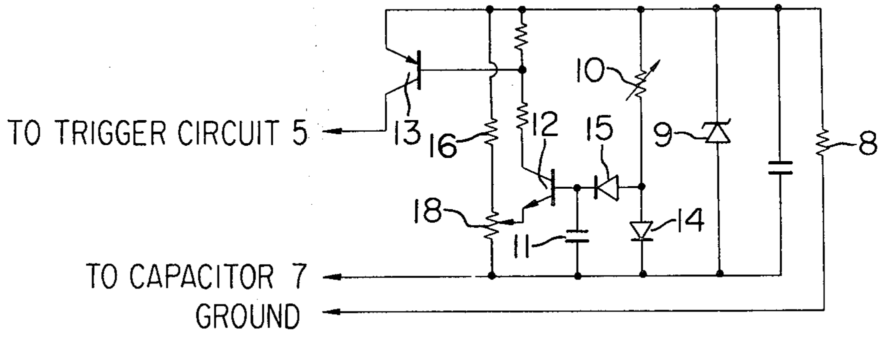

Fourth Embodiment, FIG. 6

The fourth embodiment shown in FIG. 6 is a combination of the second and third embodiments shown in FIGS. 4 and 5, respectively. A guide number may be set with either the emitter level control variable resistor 18 or the variable resistor 10 in the integrating circuit. Alternatively, the variable resistors 10 and 18 may be ganged in a suitable manner. When one of the variable resistors 10 and 18 is used for setting a guide number, the other is used for the fine adjustment in the process of the manufacture of the electronic flash so as to attain more accurate guide number setting.

What is claimed is:

1. In an electronic flash of the type incorporating a variable guide number device comprising a signal generating circuit comprising an integrating circuit for integrating a voltage across a constant voltage element which is actuable in response to turning on of a flash lamp, and a switching circuit actuable in response to the output from said integrating circuit; and a flash control circuit for controlling the quantity of a flash of light emitted from said flash lamp in response to the output from said signal generating circuit;

the improvement wherein said integrating circuit comprises a series circuit consisting of a variable resistor, a first diode and an integrating capacitor connected in series in the order named; and a second diode connected in parallel with a series circuit consisting of said first diode and said integrating capacitor, whereby a charging voltage for said integrating capacitor may be controlled by said variable resistor and said first and second diodes.

2. An electronic flash as set forth in claim 1, wherein said switching circuit includes a transistor whose emitter level is controlled by a resistor and whose base is connected to the junction point between said first diode and said integrating capacitor, whereby said transistor may be enabled when the voltage charged across said integrating capacitor rises to a predetermined level.

3. An electronic flash as set forth in claim 2 wherein the emitter level control resistor is a variable resistor.

4. In an electronic flash of the type incorporating a variable guide number device comprising a signal generating circuit comprising an integrating circuit for integrating a voltage across a constant voltage element which is actuable in response to turning on of a flash lamp, and a switching circuit actuable in response to the output from said integrating circuit; and a flash control circuit for controlling the quantity of a flash of light emitted from said flash lamp in response to the output from said signal generating circuit;

the improvement wherein said integrating circuit comprises a series circuit consisting of a resistor, a first diode and an integrating capacitor connected in series in the order named, and a second diode connected in parallel with a series circuit consisting of said first diode and said integrating capacitor, whereby the charging voltage for said integrating capacitor may be controlled by said resistor and said first and second diodes; and said switching circuit includes a transistor whose emitter level is controlled by a variable resistor and whose base is connected to the junction point between said first diode and said integrating capacitor, whereby when the voltage across said integrating capacitor rises to a predetermined level said transistor may be enabled.

* * * * *